US009953068B1

(12) United States Patent
Taboriskiy et al.

(10) Patent No.: US 9,953,068 B1
(45) Date of Patent: Apr. 24, 2018

(54) COMPUTING USAGE METRICS FOR A CONTENT SHARING PLATFORM (71) Applicant: Google Inc., Mountain View, CA (US)

(72) Inventors: Alexander Taboriskiy, Zurich (CH); Martin Landers, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 366 days.

(21) Appl. No.: 14/055,363

(22) Filed: Oct. 16, 2013

(51) Int. Cl.
G06F 17/30 (2006.01)

(52) U.S. Cl.
CPC ................ G06F 17/3056 (2013.01)

(58) Field of Classification Search
CPC ......... G06F 17/30038; G06F 17/30749; G06F 17/30752; G06F 17/3082; G06F 17/30097; G06F 17/30109; G06F 17/30769; G06F 17/30784; G06F 17/30799; G06F 17/30902; G06F 17/3056
USPC ....................................... 707/755
See application file for complete search history.

(56) References Cited

U.S. PATENT DOCUMENTS

| 7,590,647 | B2 * | 9/2009 | Srinivasan | G06F 17/245 |
| 8,566,315 | B1 * | 10/2013 | Davtchev | G06F 17/30817 |
| | | | | 707/736 |
| 2002/0078174 | A1 * | 6/2002 | Sim | G06F 17/30194 |
| | | | | 709/219 |
| 2004/0221311 | A1 * | 11/2004 | Dow | G06F 17/30784 |
| | | | | 725/52 |
| 2007/0156726 | A1 * | 7/2007 | Levy | 707/100 |
| 2007/0174302 | A1 * | 7/2007 | Ishiguro | G06F 11/1469 |
| 2009/0292672 | A1 * | 11/2009 | Kunjithapatham | |
| | | | | G06F 17/30038 |
| 2010/0010944 | A1 * | 1/2010 | Cheng | G06F 17/30032 |
| | | | | 706/12 |
| 2010/0306368 | A1 * | 12/2010 | Gagliardi | H04L 43/045 |
| | | | | 709/224 |
| 2012/0197914 | A1 * | 8/2012 | Harnett | G06F 17/30637 |
| | | | | 707/755 |
| 2012/0215794 | A1 * | 8/2012 | Fukuda | G06F 17/30557 |
| | | | | 707/749 |
| 2013/0018900 | A1 * | 1/2013 | Cheng | G06F 7/00 |
| | | | | 707/755 |
| 2013/0031113 | A1 * | 1/2013 | Feng | G06F 17/3087 |
| | | | | 707/755 |

* cited by examiner

Primary Examiner — Baoquoc N To
Assistant Examiner — Saba Ahmed
(74) Attorney, Agent, or Firm — Lowenstein Sandler LLP (57) ABSTRACT A method for computing usage metrics for a content sharing platform is disclosed. The method includes receiving usage logs of a content sharing platform, the usage logs pertaining to a plurality of events associated with content items of the content sharing platform. The method further includes, for each usage log, identifying an event associated with the usage log, parsing the usage log to identify a set of characteristics for the identified event, obtaining additional information about the identified event based on the set of characteristics, and storing the set of characteristics and the additional information as an event entry for the event. The method also includes storing metadata corresponding to the event separately from the event entry, the metadata to be provided with the event entry to a user upon a user request for information about the event.

20 Claims, 6 Drawing Sheets

```
Access entry of raw log data, the entry corresponding to an event occurring with
respect to a content item at a content sharing platform
                                                                              310
```

```
Parse raw log data entry to identify portions of the data corresponding to pre-defined
fields
                                                                              320
```

```
Store identified data to corresponding raw data fields of a structured event baseview
entry
                                                                              330
```

```
Classify each raw data field of the structured event baseview entry to generate
derived data fields for the structured event baseview entry
                                                                              340
```

```
Store derived data fields together with the raw data fields in the structured event
baseview entry that is indexed by an external ID of the content item associated with
the structured event baseview entry
                                                                              350
```

Access event baseview entry for a content item identified by an external ID, the content item hosted by a content sharing platform maintaining a data store of event baseview entries for correspopnding content items of the content sharing platform
510

↓

Extract one of derived data fields from the event baseview entry or raw data fields from the event baseview entry
520

↓

Access a processed metadata entry corresponding to the external ID
530

↓

Perform a join operation on the extracted data of the access event baseview entry and the accessed processed metadata entry to generate a comprehensive log entry for the content item identified by the external ID
540

COMPUTING USAGE METRICS FOR A CONTENT SHARING PLATFORM

TECHNICAL FIELD

This disclosure relates to the field of content sharing platforms and, in particular, to computing usage metrics for a content sharing platform.

BACKGROUND

Content sharing platforms that provide content, such as video data, typically use performance metrics and data to drive business decisions. These metrics include, but are not limited to, content item views (such as video views), watch time, channel subscriptions, and so on. In addition, the content sharing platform may also seek to analyze the usage metrics based on a variety of filters, such as geographic, time, video, and so on.

A common source of usage metrics in content sharing platforms is usage logs. The usage logs consist of raw event records, often closely-tied to the system that writes the log (e.g., giving HyperText Transport Protocol (HTTP) request strings with little to no immediate semantics). The usage logs tend to contain billions of events for a single date, and in some cases, also contain sensitive data, such as cookies or Internet Protocol (IP) addresses.

With the widely-different needs for analysis of usage metrics, multiple independent log processing pipelines have emerged on content sharing platforms, with each pipeline going directly from the raw logs to specific sets of reports. This approach typically leads to metric inconsistencies because of the discrepancies between processing logic at the individual pipelines. Because the pipelines tend to be written by different teams of individuals at different times and using different technologies, aligning the definitions by providing common classification libraries may not be a viable solution. Also, unifying all the pipelines into a single system to provide all reports can be prohibitive in terms of resources and engineering time.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for computing usage metrics for a content sharing platform is disclosed. The method includes receiving usage logs of a content sharing platform, the usage logs pertaining to a plurality of events associated with content items of the content sharing platform. The method further includes, for each usage log, identifying an event associated with the usage log, parsing the usage log to identify a set of characteristics for the identified event, obtaining additional information about the identified event based on the set of characteristics, and storing the set of characteristics and the additional information as an event entry for the event. The method also includes storing metadata corresponding to the event separately from the event entry, the metadata to be provided with the event entry to a user upon a user request for information about the event.

In one implementation, the set of characteristics of the method include at least one of referrer uniform resource locator (URL), a device family, a view type bitmask, a total watch time, or a playback URL. In addition, the metadata includes at least one of a channel associated with the one or more content items, owners of the one or more content items, whether the one or more content items are public or private, a list of claims on the one or more content items, or a time of creation of the one or more content items.

In some implementations, the user request includes a request to generate a report on at least a portion of the usage logs, and wherein the set of characteristics and the additional information are made available for use in generating the report. Furthermore, the set of characteristics and the additional information are made available for use in generating the report. In another implementation, the method further comprises aggregating combined event entry and metadata corresponding to one or more content items for the report. The obtaining the additional information of the method may further comprise determining a source of the event, determining a type of device associated with the event, determining whether the event is to be counted based on a watch time of the event, and determining whether the event is a promotion.

Furthermore, the events in the method may include users of the content sharing platform requesting to view the content items streamed from the content sharing platform. In addition, the usage logs of the method may include HyperText Transport Protocol (HTTP) request strings sent from devices of the users when requesting to view the content items. Lastly, the event entry may include an event baseview entry.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for computing usage metrics for a content sharing platform. In implementations of the disclosure, raw log records produced by a content sharing platform are parsed and processed to generate common event baseviews. Each common event baseview may pertain to different types of actions (e.g., user-generated or system-generated) with respect to the content sharing platform (e.g., content item view, subscription to an entity of the content sharing platform, etc.), and, as such, be associated with one or more content items of the content sharing platform. The common event baseview can be combined with metadata associated with the corresponding content item(s). The metadata is maintained separately from the common event baseview to decrease resource usage by the log system of the content sharing platform.

Implementations of the disclosure have a different layer of granularity than previous solutions for computing usage metrics for a content sharing platform. Previously, content sharing platforms utilized multiple independent log processing pipelines, each going directly from raw logs to a specific report. This led to metric inconsistencies and inefficient resource usage. By implementing methods for computing usage metrics for a content sharing platform of the disclosure, the generated common event baseviews reduce discrepancies in report generation and maintain a highly-scalable production system. In addition, consistent metrics can be established across a content sharing platform, allowing the content sharing platform to utilize these metrics to facilitate business decisions, as the metrics should accurately reflect usage data throughout the overall content sharing platform.

Figure 1:
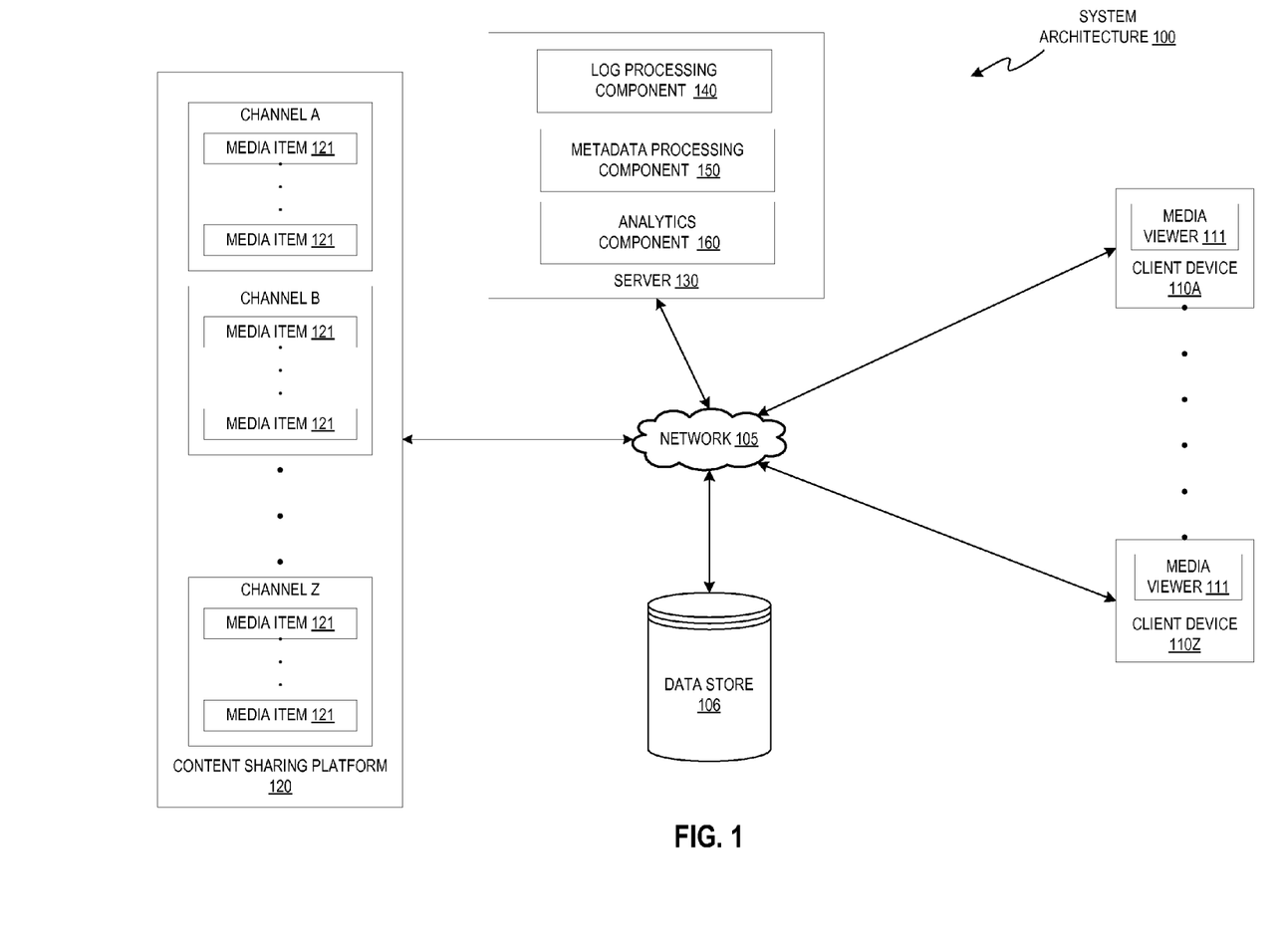
FIG. 1 illustrates an example system architecture, in accordance with one implementation of the disclosure.

FIG. 1 illustrates an example system architecture 100, in accordance with one implementation of the disclosure, for navigation of a list of content sharing platform media items on a client device via gesture controls and contextual synchronization. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consumer, upload, search for, approve of ("like"), dislike, and/or comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a log processing component 140, a metadata processing component 150, and an analytics component 160. In one implementation, the log processing component 140 provides a central chain of processing stages for logs parsing and classification of raw log records (e.g., stored in data store 106) corresponding to events (e.g., content item views) occurring at the content sharing platform 120. An "event" may refer to different types of user-generated or system-generated actions with respect to the content sharing platform (e.g., content item view, subscription to an entity of the content sharing platform, upload of content item, etc.), and, as such, be associated with one or more content items of the content sharing platform. The term "raw" refers to data that is originally recorded in the log records in an unprocessed and original format.

In one implementation, the log processing component 140 produces "event baseview" entries (also called "structured" event baseview entries or event entries) to represent the data of the raw log records. As a result, entries represented in a form of the event baseview may be semantically meaningful (after classification), but are not aggregated. This preserves the ability of clients (e.g., analysis systems, end users of the content sharing platform, a third party organization, etc.) to segment data in whatever way they prefer.

In some implementation, the log processing pipeline provided by log processing component 140 can be split into parsing and classification parts, keeping both raw, parsed log data and derived classification data in the event baseview entry. This allows downstream pipelines (e.g., analytics component 160) to use pre-classified fields for consistent reports and/or fall back to unprocessed data (i.e., the raw, parsed log data) for internal analysis or tests.

Each event baseview entry may contain fields that are extracted and/or derived from the original raw log records. To reduce the size of the event baseview entries, implementations of the disclosure normalize metadata associated with the event baseview entries in a separate, versioned table. This metadata may be processed and versioned by metadata processing component 150 to be easily joinable with the event baseview entry, so that downstream pipelines, such as analytics component 160, can perform a join operation without additional logic.

Further description of the log processing component 140, metadata processing component 150, and analytics component 160, and their specific functions are described in more detail below with respect to FIG. 2.

Although implementations of the disclosure are discussed in terms of content sharing platforms and computation of usage metrics of the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
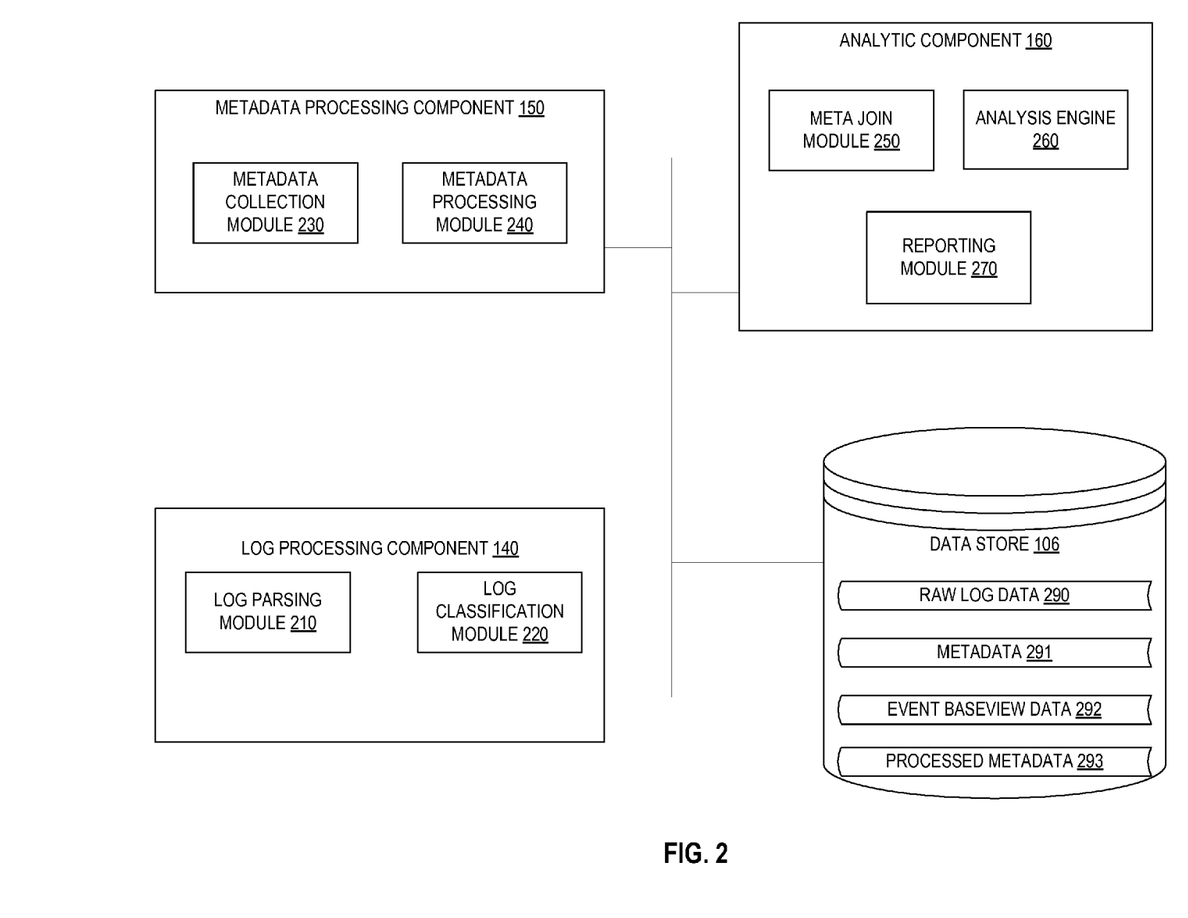
FIG. 2 is a block diagram illustrating a log processing component, a metadata processing component, and an analytics component in accordance with one implementation of the disclosure.

FIG. 2 is a block diagram illustrating a log processing component 140, a metadata processing component 150, and an analytics component 160 of FIG. 1 in accordance with one implementation of the disclosure. In one implementation, the log processing component 140 includes a log parsing module 210 and a log classification module 220. More or less components may be included in the log processing component 140 without loss of generality. For example, two of the modules may be combined into a single module, or one of the modules may be divided into two or more modules. In one implementation, one or more of the modules may reside on different computing devices (e.g., different server computers).

The metadata processing component 150 may include a metadata collection module 230 and a metadata processing module 240. More or less components may be included in the metadata processing component 150 without loss of generality. For example, two of the modules may be combined into a single module, or one of the modules may be divided into two or more modules.

The analytics component 160 may include a meta join module 250, an analysis engine 260, and a reporting module 270. More or less components may be included in the metadata analytics component 160 without loss of generality. For example, two of the modules may be combined into a single module, or one of the modules may be divided into two or more modules.

The log processing component 140 metadata processing component 150, and an analytics component 160 may be communicatively coupled to each other and to the data store 106. For example, the log processing component 140 metadata processing component 150, and an analytics component 160 may be coupled to each other and the data store 106 via a network (such as via network 105 as illustrated in FIG. 1).

In another example, the log processing component 140 may be coupled directly to a server where the log processing component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes log data 290, metadata 291, event baseview data 292, and processed metadata 293.

As discussed above, the log processing component 140 provides a single logs parsing and processing pipeline to identify and classify raw log data 290 of events (e.g., content item views) occurring at the content sharing platform. The log processing component 140 may produce event baseview data 292 to represent the data of the processed raw log records 290. As a result, entries represented in the event baseview data 292 may be semantically meaningful (after classification), but are not aggregated.

The logs processing pipeline provided by log processing component 140 can be split into parsing and classification parts, keeping both raw, parsed data and derived classification in the event baseview entry 292. The log parsing module 210 of log processing component 140 may perform the parsing operations on raw log data 290. Log parsing module 210 may access each entry in log data 290. Log data 290 entries may include a variety of different information that is not structured in any particular format. For example, a log data 290 entry may include a HyperText Transport Protocol (HTTP) header, or a processed version of an HTTP header including information (e.g., user agent) extracted by the content sharing platform to store in log data 290. Instead, the information is placed in the log data 290 portion of data store 106 as various enumerations, strings, numbers, and so on.

A log entry 290 may contain different fields or sets of characteristics including, but not limited to, a HTTP request Uniform Resource Locator (URL), a type of event (e.g., playback, subscription, etc.), content item or channel that the event is related to, whether the event is a spam playback or not, a playback device type, time of playback, and so on. In one example, a log entry for a particular video view may be a bitmask defining a view type, a time of the view, a video identifier (ID), a referrer URL, a type of playback device family, and so on. The log parsing module 210 may process the raw log data entry 290 into processed raw data that is easy to read and query, without applying any logic to the raw log record data. For example, the log parsing module 210 may identify and delineate data within a raw log record to associate with different defined fields of an event baseview. In the above example of the raw log record entry for the video view, the bitmask defining view type, time of the view, video ID, referrer URL, type of playback device family may be parsed into [external video ID, is view or spam, time of view, referred (traffic source) domain, referred path, value of a field in referrer URL containing referrer channel (if viewer came from a channel of the content sharing platform), playback family device] by the log parsing module 210.

The log classification module 220 of log processing component 140 may further process the raw log data 290 by applying logic to the parsed data to classify the data into derived log data. In some implementations, the classification performed by log classification module 200 is also referred to as obtaining additional information corresponding to the parsed data. For example, the raw log data may be first parsed to identify the field of 'referrer classification.' Log parsing module 210 may identify and delineate the portion of the raw log record data that denotes the referrer of the event and store this portion to the corresponding field in the event baseview entry (e.g., a name of the content sharing platform, a direct link, a secondary link, and so on). The log classification module 220 may further process this identified data field to provide a second-level classification, such as the channel of the content sharing platform referred from, the content item referred from, the social network referred from, the device type (e.g., tablet, mobile phone, desktop, etc.) referred from, and so on.

Table 1 provides additional examples of the parsing and classification operations of log processing component 140.

TABLE 1

| RAW LOG DATA | PARSED DATA | DERIVED/CLASSIFIED DATA |
|---|---|---|
| Referrer URL | Parts of Referrer URL | Actual traffic source classification (e.g., channel, social network, user page, direct link, content item page, promotion ID) |
| Device Family | Device family | Device classification (e.g., type, manufacturer, OS platform, etc.) |
| View Type Bitmask & Total Watch Time | Is view or spam & total watch time | Should this view's watch time be counted or not |
| Playback URL | List of playback attributes (e.g., &attrib = URL part) | Whether attribute is associated with a promotion (e.g., if attrib=ad-*) |

As described above, entries in the event baseview data 292 contain the fields that are extracted or computed from events in the raw log data 290. To reduce the size of the event baseview data 292, implementations of the disclosure normalize metadata 291 associated with the events of the raw log data 290 in a separate, versioned table of processed metadata 293. Metadata 291 associated with an event is preprocessed and versioned by metadata processing component 150 to be easily joinable, so downstream pipelines, such as analytics component 160, can perform a join operation between event baseview data 292 and processed metadata 293 without additional logic.

Metadata collection module 230 may identify and collect metadata for event baseview entries. As some content items may be associated with different identifier formats internally at the content sharing platform (e.g., different users upload the same content item at different locations in the content sharing platform), the metadata collection module 230 identifies these different content item IDs and associates the metadata associated with each content item ID to an external content item ID for the content item. The metadata processing module 240 may then process the collected metadata to create an easily-joinable processed metadata entry 293 containing consistent and easy-to-read fields.

For example, the metadata collection module 230 locates an entry for an original metadata key for an entry for a video. This entry and its associated metadata may be represented as [video id in an internal format]→[channel id, some owners, public or private, list of claims, time of creation, other information associated with the content item (sometimes having confusing names and inconsistent data)]. In addition, the metadata collection module 230 may locate another entry in a different part of the content sharing platform listing other owners for the content item, which can be represented as follows: [video id in a different internal format]→[other owners]. The metadata processing module 240 then processes these collected metadata entries to create a single processed metadata entry 293 for the content item with consistent and easy-to-read fields that are easily-joinable to the event baseview entry 292.

An example of a processed metadata entry 293 may be shown as follows: [video external id]→[channel id, all owners, public or private, list of claims, time of creation]. In one implementation, the metadata processing component 150 may process metadata independently from and asynchronous with the raw log data processing by log processing component 140.

After the log processing component 140 and metadata processing component 150 have processed the data associated with an event, raw+derived event baseview data 292 and processed metadata 293 exist for the event. The event baseview data 292 can be joined with the processed metadata 293 using a key value, such as an external content item ID. These feeds of data may be independently jointed and subsets of the data may be accessed on a case-by-case basis. Furthermore, a client, such as analytic component 160, that wishes to process log data can select between the derived fields (where logic is applied) of the event baseview entry 292 and raw fields of the event baseview entry 292 containing the data that the logic is based upon.

Figure 3:
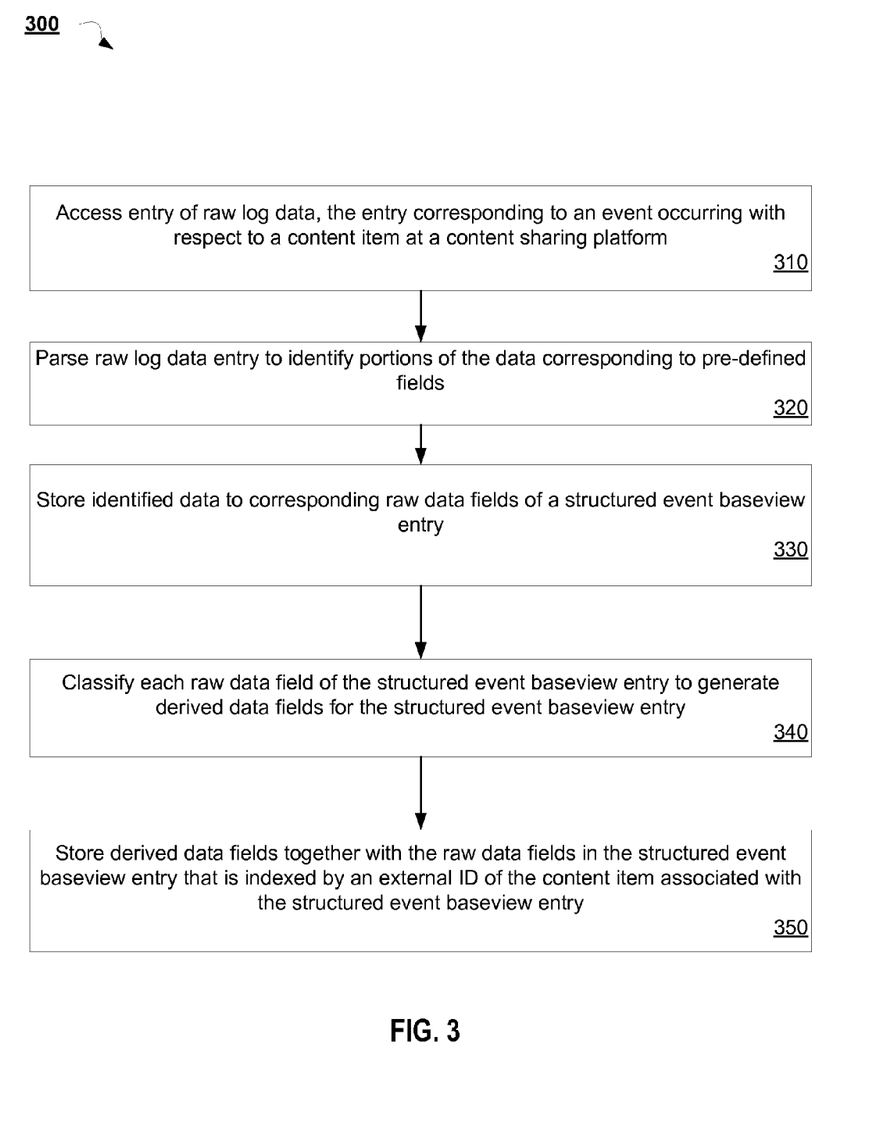
FIG. 3 is a flow diagram illustrating a method for parsing raw log data for computing usage metrics for a content sharing platform, according to some implementations of the disclosure.

FIG. 3 is a flow diagram illustrating a method 300 for parsing raw log data for computing usage metrics for a content sharing platform, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by log processing component 140, as shown in FIGS. 1 and 2.

Referring to FIG. 3, at block 310, method 300 begins at block 310 where an entry of raw log data is accessed. In one implementation, the entry corresponds to an event occurring with respect to a content item hosted by a content sharing platform. The raw log data entry may include a variety of different information that is not structured in any particular format and is placed in the logs of the content sharing platform in the form of various enumerations, strings, numbers, and so on. A raw log data entry may contain different fields including, but not limited to, a HTTP request URL, a type of event (e.g., playback, subscription, etc.), content item or channel that the event is related to, whether the event is a spam playback or not, a playback device type, time of playback, and so on. In one example, a log entry for a particular video view may be a bitmask defining a view type, a time of the view, a video ID, a referrer URL, a type of playback device family, and so on.

At block 320, the raw log data entry is parsed to identify portions of the data that correspond to pre-defined fields. For example, the raw log data may include a bitmask of data, where the different portions of the bitmask correspond to different fields of data. Then, at block 330, the identified data is stored to corresponding raw data fields of a structured event baseview entry.

Subsequently, at block 340, the raw data fields of the structured event baseview entry are further classified to generate derived data fields for the structure event baseview entry. By applying classification functionality to the raw data fields, a second level of derived data may also be included as part of the structured event baseview entry. For example, the raw log data field for 'referrer classification' may include data, such as a name of the content sharing platform, a direct link, or a secondary link as the referrer. This raw data field may be further processed to provide a second-level of classification, such as the channel referred from, the content item referred from, the social network referred from, the device type (e.g., tablet, mobile phone, desktop, etc.) referred from, and so on.

Lastly, at block 350, the derived data fields are stored together with the raw data fields in the structured event baseview entry. The structured event baseview entry may further be indexed by an external ID of the content item that is represented by the structured event baseview entry.

Figure 4:
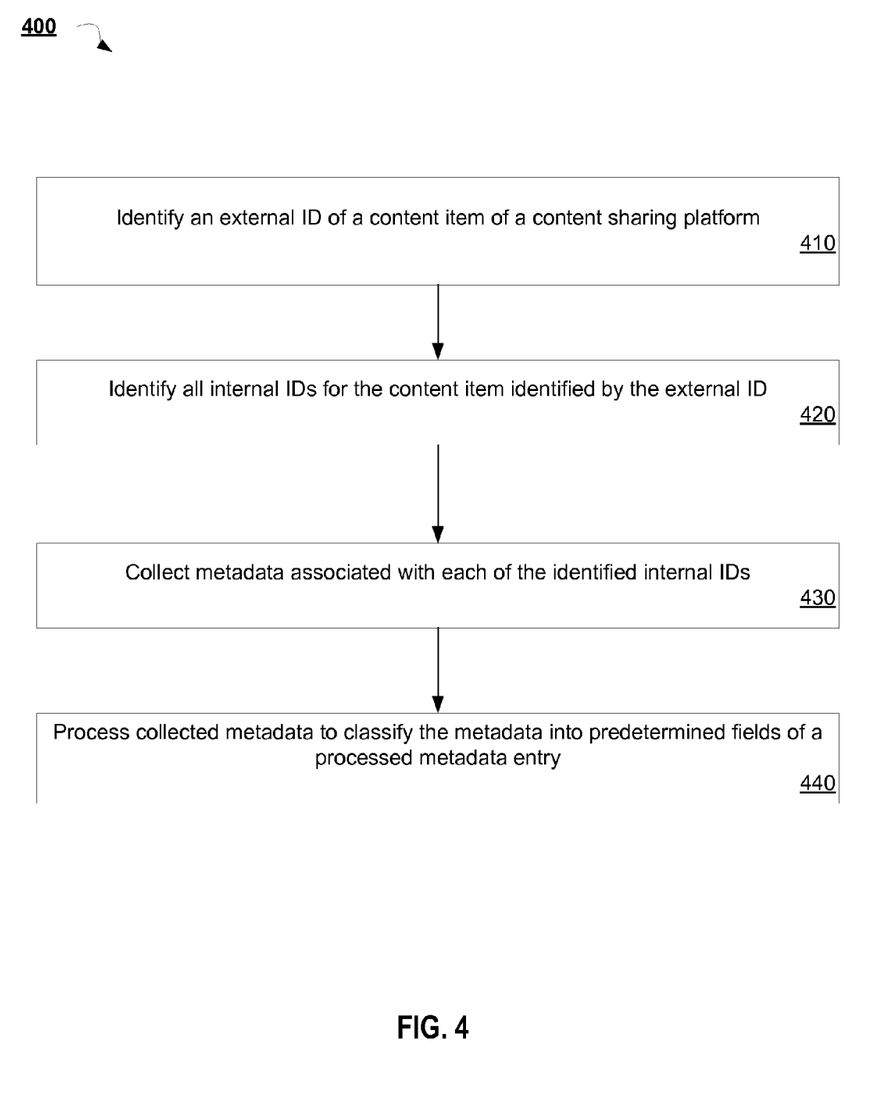
FIG. 4 is a flow diagram illustrating a method for collecting metadata for computing usage metrics for a content sharing platform, according to an implementation of the disclosure.

FIG. 4 is a flow diagram illustrating a method 400 for collecting metadata for computing usage metrics for a content sharing platform, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by metadata processing component 150 as shown in FIGS. 1 and 2.

Referring to FIG. 4, at block 410, method 400 begins at block 410 where an external ID of a content item of a content sharing platform is identified. Then, at block 420, all internal IDs for the content item associated with the external ID in the content sharing platform are identified. In some implementations, a content item owned by different users on the content sharing platform may be associated with different internal IDs, but the same external ID.

At block 430, metadata associated with each of the identified internal IDs is collected. The metadata may be stored in one or more data stores of the content sharing platform. Then, at block 440, the collected metadata is processed to classify the metadata into predetermined fields of a processed metadata entry. The processed metadata entry may be indexed by the external ID of the content item.

Figure 5:
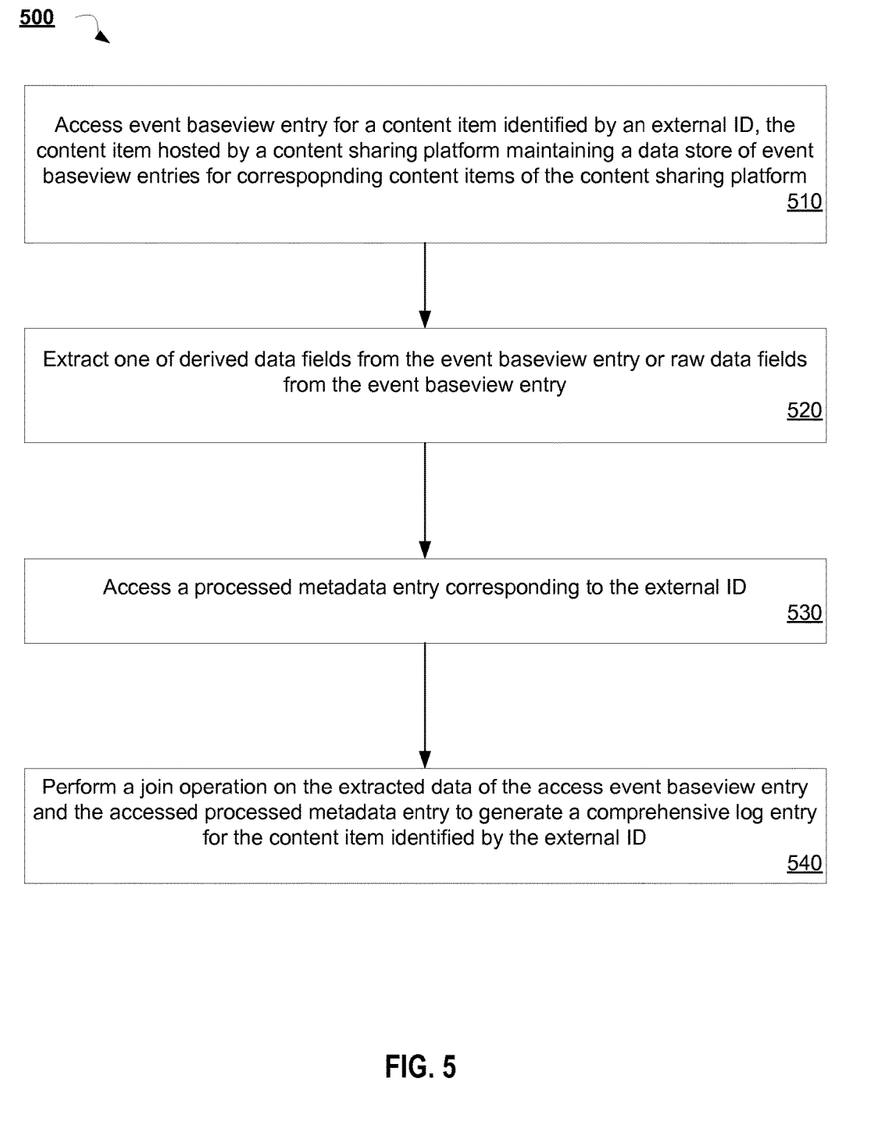
FIG. 5 is a flow diagram illustrating a method for generating a joined log entry for computing usage metrics for a content sharing platform, according to an implementation of the disclosure.

FIG. 5 is a flow diagram illustrating a method 500 for generating a joined log entry for computing usage metrics for a content sharing platform, according to an implementation of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by analytics component 160 as shown in FIGS. 1 and 2.

Referring to FIG. 5, at block 510, method 500 begins at block 510 where a event baseview entry for a content item hosted by a content sharing platform is accessed. In one implementation, an external ID of the content item is used to access the event baseview entry. Then, at block 520, at least one of derived data fields and/or raw data fields are extracted from the event baseview entry and associated with the external ID of the content item.

Subsequently, at block 530, a processed metadata entry corresponding to the external ID of the content item is also accessed. Lastly, at block 540, a join operation on the extracted data of the event baseview entry and the processed metadata entry is performed. The join operation generates a comprehensive log entry for the content item identified by the external ID. This comprehensive log entry provides consistent log data for a content item that results in uniform analytics and statistics reports for content items throughout the content sharing platform.

Figure 6:
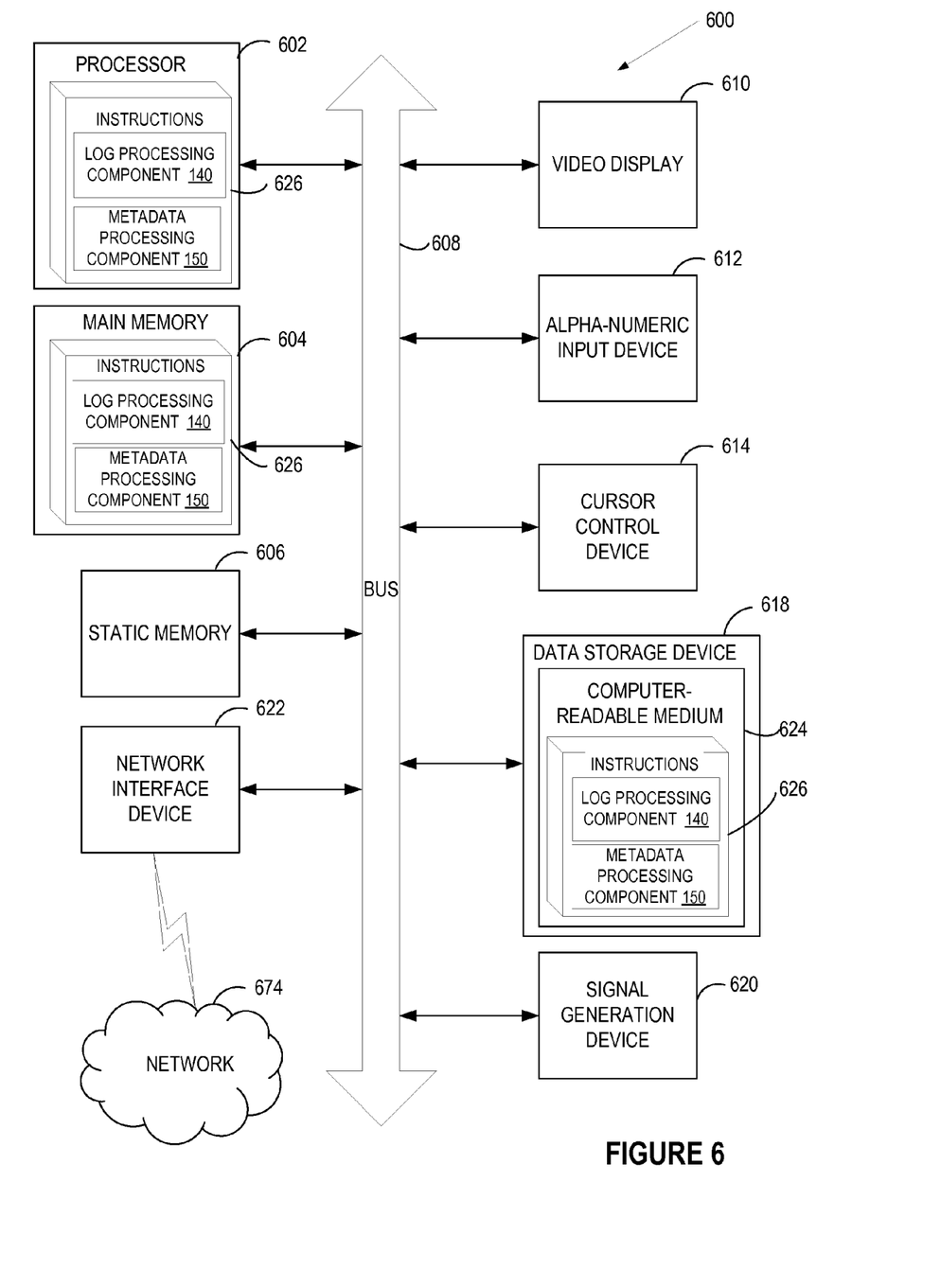
FIG. 6 is a block diagram illustrating an exemplary computer system, according to some implementations.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one embodiment, the instructions 626 include instructions for a log processing component 140 and/or a metadata processing component 150, which may correspond, respectively, to their identically-named counterparts described with respect to FIGS. 1 and 2, and/or a software library containing methods that call a log processing component and/or a metadata processing component for computing usage metrics for a content sharing platform. While the computer-readable storage medium 624 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device, usage logs of a content sharing platform, the usage logs pertaining to events associated with content items of the content sharing platform, wherein the usage logs comprise data pertaining to the events, the data stored using an unstructured format;
   for each usage log, processing the usage log in a single parsing and processing pipeline executed by the processing device, where the single parsing and processing pipeline is to:
      identify an event associated with the usage log;
      parse the unstructured format of the data of the usage log to identify parsed data comprising a set of characteristics for the identified event, wherein parsing the unstructured format of the data comprises delineating the data to associate with different fields corresponding to the set of characteristics for the identified event;
      derive classification data about the identified event from the parsed data, the classification data not comprised in the data of the usage log and comprising at least a source of the event and a type of device associated with the event; and
      store the parsed data and the classification data as an event entry for the event, wherein the event entry is stored using a structured format; and
   storing metadata corresponding to the event separately from the event entry, the metadata to be combined with the event entry to create a log entry, wherein the log entry is provided as a response to a request for information about the event received from a downstream pipeline.

2. The method of claim 1, wherein the set of characteristics comprise at least one of referrer uniform resource locator (URL), a device family, a view type bitmask, a total watch time, or a playback URL.

3. The method of claim 1, wherein the metadata comprises at least one of a channel associated with the one or more content items, owners of the one or more content items, whether the one or more content items are public or private, a list of claims on the one or more content items, or a time of creation of the one or more content items.

4. The method of claim 1, wherein the request comprises a request to generate a report on at least a portion of the usage logs, and wherein the parsed data and the classification data are made available for use in generating the report.

5. The method of claim 4, further comprising aggregating one or more log entries comprising combined event entry and metadata corresponding to one or more content items for the report.

6. The method of claim 1, wherein the deriving the classification data further comprises:
   determining the source of the event;
   determining the type of device associated with the event;
   determining whether the event is to be counted based on a watch time of the event; and
   determining whether the event is a promotion.

7. The method of claim 1, wherein the events comprise user requests to view the content items streamed from the content sharing platform.

8. The method of claim 1, wherein the usage logs comprises HyperText Transport Protocol (HTTP) request strings sent from devices of the users when requesting to view the content items.

9. The method of claim 1, wherein the event entry comprises an event baseview entry.

10. A non-transitory machine-readable storage medium storing instructions which, when executed, cause a processing device to perform operations comprising:
   receiving, by the processing device, usage logs of a content sharing platform, the usage logs pertaining to events associated with content items of the content sharing platform, wherein the usage logs comprise data pertaining to the events, the data stored using an unstructured format;
   for each usage log, processing the usage log in a single parsing and processing pipeline executed by the processing device, where the single parsing and processing pipeline is to:

identify an event associated with the usage log;
parse the unstructured format of the data of the usage log to identify parsed data comprising a set of characteristics for the identified event, wherein parsing the unstructured format of the data comprises delineating the data to associate with different fields corresponding to the set of characteristics for the identified event;
derive classification data about the identified event from the parsed data, the classification data not comprised in the data of the usage log and comprising at least a source of the event and a type of device associated with the event; and
store the parsed data and the classification data as an event entry for the event, wherein the event entry is stored using a structured format; and
storing metadata corresponding to the event separately from the event entry, the metadata to be combined with the event entry to create a log entry, wherein the log entry is provided as a response to a request for information about the event received from a downstream pipeline.

11. The non-transitory machine-readable storage medium of claim 10, wherein the set of characteristics comprise at least one of referrer uniform resource locator (URL), a device family, a view type bitmask, a total watch time, or a playback URL.

12. The non-transitory machine-readable storage medium of claim 10, wherein the metadata comprises at least one of a channel associated with the one or more content items, owners of the one or more content items, whether the one or more content items are public or private, a list of claims on the one or more content items, or a time of creation of the one or more content items.

13. The non-transitory machine-readable storage medium of claim 10, wherein the request comprises a request to generate a report on at least a portion of the usage logs, and wherein the parsed data and the classification data are made available for use in generating the report.

14. The non-transitory machine-readable storage medium of claim 13, further comprising aggregating one or more log entries comprising combined event entry and metadata corresponding to one or more content items for the report.

15. The non-transitory machine-readable storage medium of claim 10, wherein the deriving the classification data further comprises:
determining the source of the event;
determining type of device associated with the event;
determining whether the event is to be counted based on a watch time of the event; and
determining whether the event is a promotion.

16. A system comprising:
a processing device;
a memory coupled to the processing device, the memory to store a plurality of media items; and
a log processing component executable by the processing device from the memory, the log processing component to:
receive usage logs of a content sharing platform, the usage logs pertaining to events associated with content items of the content sharing platform, wherein the usage logs comprise data pertaining to the events, the data stored using an unstructured format;
for each usage log, process the usage log in a single parsing and processing pipeline executed by the processing device, where the single parsing and processing pipeline is to:
identify an event associated with the usage log;
parse the unstructured format of the data of the usage log to identify parsed data comprising a set of characteristics for the identified event, wherein parsing the unstructured format of the data comprises delineating the data to associate with different fields corresponding to the set of characteristics for the identified event;
derive classification data about the identified event from the parsed data, the classification data not comprised in the data of the usage log and comprising at least a source of the event and a type of device associated with the event; and
store the parsed data and the classification data as an event entry for the event, wherein the event entry is stored using a structured format; and
a metadata processing component executable by the processing device from the memory, the metadata processing component to metadata corresponding to the event separately from the event entry, the metadata to be combined with the event entry to create a log entry, wherein the log entry is provided as a response to a request for information about the event received from a downstream pipeline.

17. The system of claim 16, wherein the set of characteristics comprise at least one of referrer uniform resource locator (URL), a device family, a view type bitmask, a total watch time, or a playback URL.

18. The system of claim 16, wherein the metadata comprises at least one of a channel associated with the one or more content items, owners of the one or more content items, whether the one or more content items are public or private, a list of claims on the one or more content items, or a time of creation of the one or more content items.

19. The system of claim 16, further comprising an analytics component to aggregate one or more log entries comprising combined event entry and metadata corresponding to one or more content items for the report.

20. The system of claim 16, wherein the logs processing component to derive the classification data further comprises the logs processing component to:
determine the source of the event;
determine the type of device associated with the event;
determine whether the event is to be counted based on a watch time of the event; and
determine whether the event is a promotion.

* * * * *